United States Patent [19]

Yaotani et al.

[11] Patent Number: 4,637,767
[45] Date of Patent: Jan. 20, 1987

[54] THREADED FASTENER

[75] Inventors: Kouichi Yaotani, Akikawa; Fumio Nakada, Hatano; Takao Tanaka, Hino; Minoru Yoshida, Hachiouji, all of Japan

[73] Assignee: Topura Co., Ltd., Osaka, Japan

[21] Appl. No.: 685,620

[22] Filed: Dec. 28, 1984

Related U.S. Application Data

[63] Continuation of Ser. No. 332,835, Dec. 21, 1981, abandoned.

[30] Foreign Application Priority Data

Dec. 26, 1980 [JP] Japan .............................. 55-187479

[51] Int. Cl.$^4$ ............................................. F16B 35/04
[52] U.S. Cl. .................................................. 411/411
[58] Field of Search ................ 411/411, 412, 416, 417

[56] References Cited

U.S. PATENT DOCUMENTS

| 3,180,202 | 4/1965 | Kahn ............................... 411/412 X |
| 3,426,642 | 2/1969 | Phipard ............................ 411/417 |
| 3,850,074 | 11/1974 | Simons ............................ 411/416 |

FOREIGN PATENT DOCUMENTS

| 210236 | 7/1960 | Austria ............................. 411/411 |
| 2754870 | 6/1979 | Fed. Rep. of Germany ...... 411/411 |
| 1245618 | 9/1971 | United Kingdom ............... 411/411 |

Primary Examiner—Gary L. Smith
Assistant Examiner—Adrian H. Whitcomb, Jr.
Attorney, Agent, or Firm—Holman & Stern

[57] ABSTRACT

A thread fastener for fastening resilient material workpieces with small torque to obtain a strong fastening force, wherein the fastener is provided with equivalent height continuous thread convolutions on a shank and a plurality of spaced thread-type projections are petaliferously formed and on the equivalent height thread convolutions which are arranged at an appropriate lead angle.

13 Claims, 10 Drawing Figures

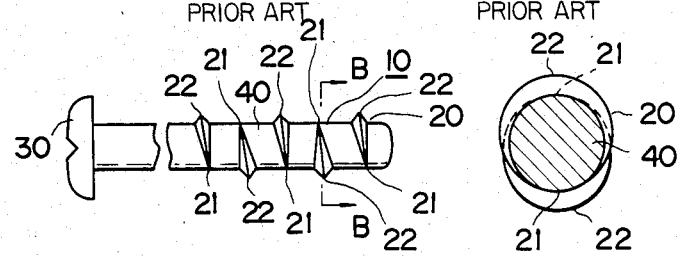
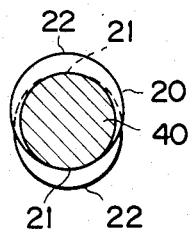
FIG. 1A PRIOR ART
FIG. 1B PRIOR ART
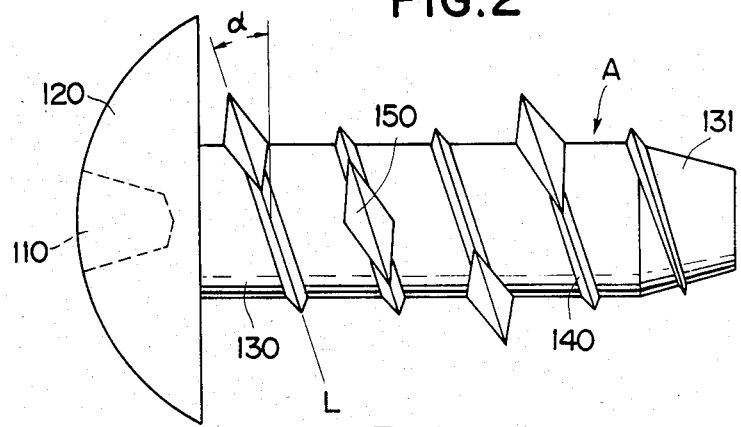
FIG. 2
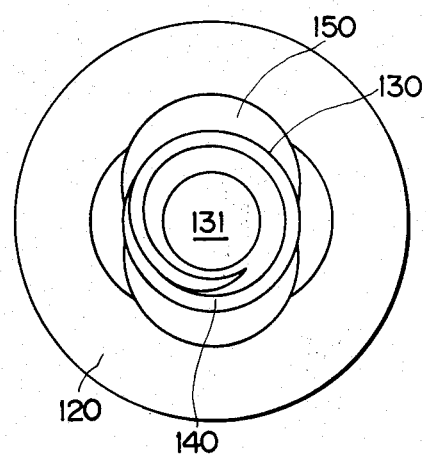
FIG. 3

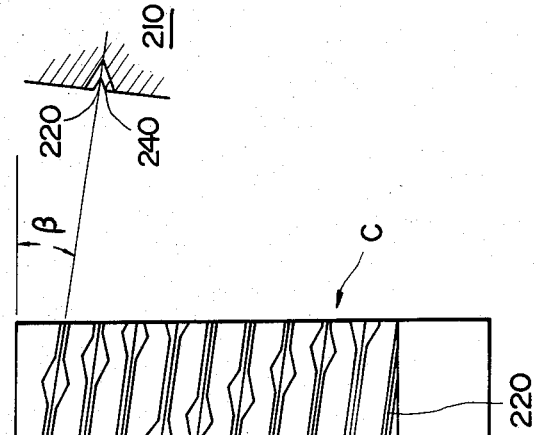
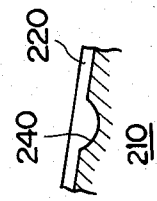
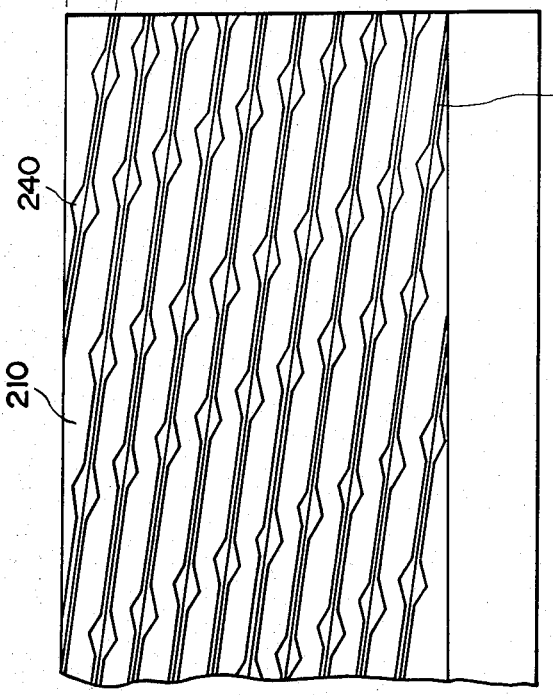

THREADED FASTENER

This is a continuation of application Ser. No. 332,835 filed Dec. 21, 1981 which in turn is now abandoned.

BACKGROUND OF THE INVENTION

1. Field of the Invention

This invention relates to an improvement of a threaded fastener, of a self-tapping screw, and more particularly to a threaded fastener structure having a plurality of spaced projections on equivalent height thread convolutions of a self-tapping screw threaded fasteners for fastening resilient workpieces.

2. Description of the Prior Art

In recent years, it has been desired to provide an improved fastener to meet the requirements for using resilient plastic material parts or the like in cars in order to assure light weight of the car and to reduce fuel costs in the automotive industry.

A tapping screw for plastic parts or the like has been provided as disclosed in the Japanese patent application publication No. 27504/79. In the conventional fastener shown in FIG. 1A and FIG. 1B, a tapping screw is formed with an eccentric screw thread 20 on a shank 40 and a head 30. The eccentric screw thread 20 is gradually reduced from maximum height to minimum height per one pitch in accordance with a helical line of the screw so that the minimum height becomes even with the outer surface of the blank of the shaft 40, and both of the blank 21 and the maximum height 22 of screw thread 20 are axially and alternately arranged longitudinally on the shank 40.

However, when the screw is fastened in the workpieces, contact area of the screw against the workpieces increasingly spreads, and therefore, large torque is required for turning the screw and after fastening, restoring efficiency of the extended overly wide area of the tapped portion of the workpieces is poor and the fastening force is weak, since the eccentric screw thread 20 of the tapping screw is formed to a slight grade and is projected at all thready sections except at the minimum height at the blank 21.

SUMMARY OF THE INVENTION

The present invention provides an improved threaded fastener having a plurality of spaced thread-type projections on thread convolutions.

Accordingly, an object of the present invention is to provide an improved thread fastener structure to fasten workpieces by relatively small fastening torque.

Another object of the present invention is to provide an improved thread fastener structure whereby the fastener is formed with constant height continuous thread convolutions at lower height than a general or commonly known thread screw convolution, and a plurality of thread-type projections are formed on the equivalent height thread convolution in spaced relation along the convolution.

Still another object of the present invention is to provide an improved thread fastener structure whereby the threaded fastener is prevented from misalignment in the hole during the fastening operation and increases tightness and the fastening force of the thread-type projections.

A further object of the present invention is to provide an improved thread fastener structure whereby the fastener is able to adjust slightly the fastening force and to increase the fastening force in addition to obtaining strong and tight fastening by resilient restoring characteristics of the workpieces.

Still further objects of the present invention will be readily appreciated as the same becomes understood by reference to the following description.

BRIEF DESCRIPTION OF THE DRAWINGS

The invention will now be described in detail with reference to the accompanying drawings wherein:

FIG. 1A is a front elevational view showing a conventional prior art tapping screw;

FIG. 1B is a cross sectional view taken along line 1B—1B in FIG. 1;

FIG. 2 is a front elevational view of a fastener of the present invention;

FIG. 3 is a side elevational view of the fastener as viewed from the right of FIG. 2;

FIG. 7A is a schematic illustration showing die means;

FIG. 7B is a schematic partial longitudinal cross sectional view showing an equivalent depth thread groove and a thread-type groove in a die means;

FIG. 7C is a schematic partial transverse cross sectional view showing an equivalent depth thread groove and a thread-type groove in a die means.

THE DETAILED DESCRIPTION OF THE INVENTION

Figure 4:
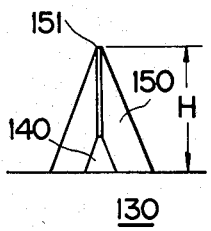
FIG. 4 is an enlarged cross sectional view showing an equivalent height thread convolutions and thready projection extended therefrom.

Referring to the drawings, which show a preferred embodiment of the present invention, FIGS. 2 and 3 show a thread fastener A having an enlarged head 120 which is formed with a suitable driving tool accomodating slot 110 therein. An unthreaded shank 130 which extends from the head 120 is a cylindrical shaft and has a slightly smaller diameter than the diameter of a hole provided in a workpiece which is made from plastic materials or the like. An end portion of the shank is formed with a tapering portion 131 for easy insertion into the hole of the workpiece.

The shank portion 130 has spirally formed thereon equivalent, or uniform, height continuous thread convolutions, or uniform, along a lead line L which has a predetermined lead angle $\alpha$, and the height of the thread convolutions is at least lower than the height of thread convolutions of a generally known standard screw. Thread-type projections 150 are formed at predetermined appropriate portions of the flanks and crest on the thread convolutions.

Each end of the thread-type projection starts from the equivalent height thread convolutions 140, and the width and the height of the projection gradually increases and forms enlarged slopes along the lead line L which end at a tip, then the width and height thereof reversely and gradually decrease and form reduced slopes along the lead line L and the reduced slopes and end at the equivalent height thread convolution 140. The height of a tip 151 (see FIG. 4) of the thread-type projection is about 20% higher than the height of a thread convolution of a standard known screw. For purposes of defining this invention in the specification and claims, the standard screw thread referred to is that set forth in the following publications: "Fastener Standards", 5th Ed; Industrial Fastener Institute (IFI), 1505 East Ohio Building, Cleveland, Ohio, 1970; "USA Standard Slotted and Recessed Head Tapping Screws and Metallic Drive Screws", U.S.A.S., B 18.6.4, American Society of Mechanical Engineers, 345 East 47th Street, New York, N.Y., 1966. Known the length of a projection 150 is at least less than a half of the periphery of the shank 130. A plurality of projections 150 are arranged on the equivalent height thread convolutions at regular intervals or at irregular intervals to form petal-like protrusions on the periphery of the shank.

As shown in FIG. 4, both cross sections 140 and 150 are triangular, and any cross sections of the thread convolutions are of similar shape, the included angles at the tip or crest line thereof being less than 60 degrees.

Figure 5:
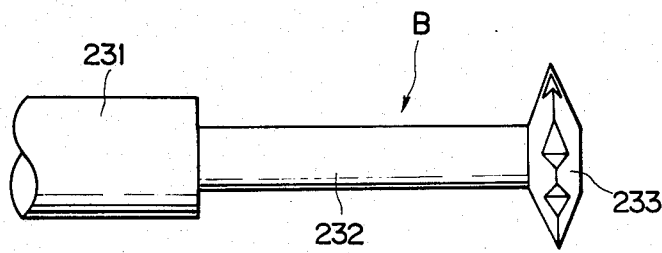
FIG. 5 is a schematic elevational view of a rotary cutter.

A method of producing the above stated thread fastener structure will now be explained. As shown in FIG. 7A, firstly a die member 210 is inclinationally formed with a plurality of continuous equivalent depth grooves 220 at equivalent lead angle $\beta$ with the lead angle $\alpha$ of the thread fastener by a cutter means, which grooves are shallower than in conventional rolling dies. Then, as shown in FIG. 5, a rotary cutter B which has respectively a handle 231, a shaft 232 and cutting edge 233 is inclinationally provided to place the cutting edge along the lead angle $\beta$ on the groove 220 of the die means 210.

Figure 6:
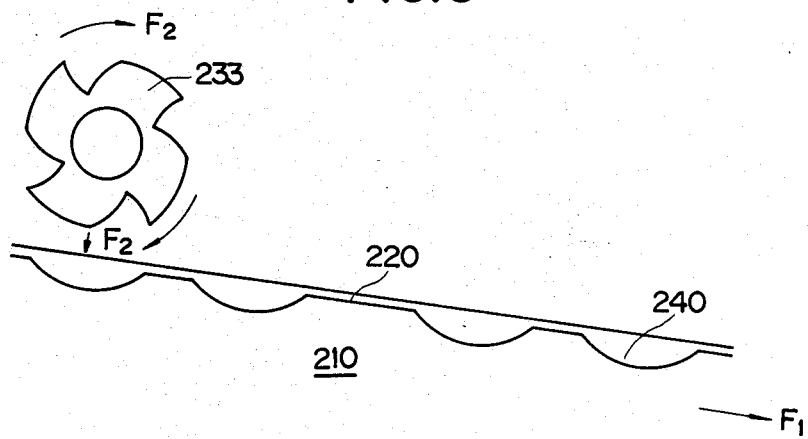
FIG. 6 is a schematic explanatory illustration showing a manner of cutting the thread type projections.
Figure 8:
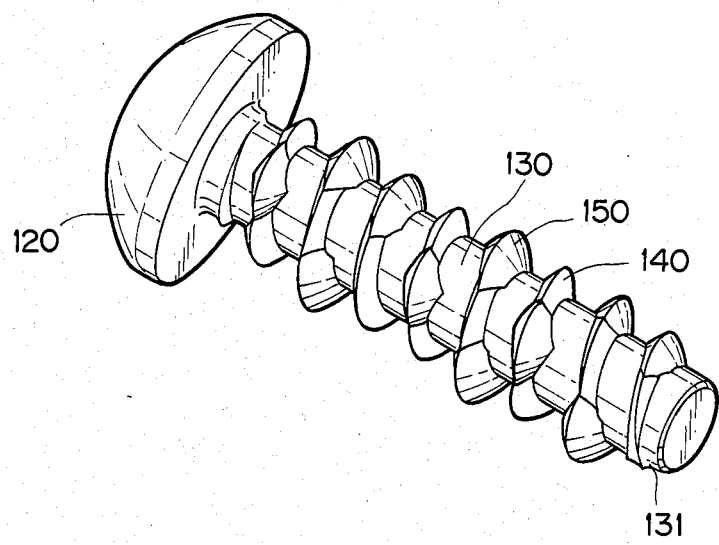
FIG. 8 is a perspective view of the screw thread of the invention.

The rotary cutter B is driven to rotate by the handle 231 which is equipped in a driving apparatus not shown in the drawings. The rotary cutter B is installed on an appropriate table for a machine tool which is able to be controllably operated either horizontally or vertically to move relatively to the die means. As shown in FIG. 6, the die means 210 is intermittently moved in a mark F1 direction as shown by an arrow head. When the die means is stopped, the cutting edge 230 of the fallen rotary cutter B is correspondingly inserted in the thread groove 220, then the cutter B is rotated in the mark F2 direction as shown by arrow heads and the thready grooves 240 are successively cut.

A die C is formed in accordance with the successive cutting operation of the grooves 240. A partial longitudinal section view of the equivalent depth groove 220 and thread groove 240 in the die 210 is shown in FIG. 7B, and a partial cross-section view of both the grooves 220 and 240 in the die 210 is also shown in FIG. 7C.

A set of dies means comprises the above explained die C and another fixed die having the same configuration, both surfaces provided with the grooves. By these dies means, the thread fastener A of the present invention is manufactured by a rolling process.

The function and effect of the threaded fastener and effect of the method of producing the fastener of the present invention will now be disclosed.

The thread fastener A is effectively used to fasten resilient workpieces made from plastic materials or the like. A hole in a workpiece is provided to have a predetermined slightly larger diameter than the diameter of the shank 130 of the fastener. The tapered end portion 131 of the thread fastener is inserted into the hole of the workpiece and the fastener A is pressed and rotated by a driver means applied in the slot 110 of the head of the threaded fastener.

First the equivalent height thread convolutions 140 which have a slightly small diameter rather than a standard known screw are rotated forwardly into the hole, and secondly the projections 150 which are intermittently provided at intermediate portion of the thread convolutions are rotated forwardly in a manner so that the resilient wall of the workpieces is compressed. In this manner, the projections are introduced into the hole along and by the equivalent height thread convolutions 140 which are loosely inserted. The projections 150 are driven smoothly and rotatingly forward, since the projections 150 are provided to project on the equivalent height thread convolutions in a manner to gradually and successively increase the width and height from the equivalent height thread convolutions along the predetermined lead angle and line L.

The contacting area of each projection with the workpiece is small and accordingly, only small fastening torque is required, since the length of the projection is relatively short. Therefore, good work efficiency is expected.

After fastening of the projections, the wall of the hole in the workpieces restores its shape and then the equivalent height thread convolutions 140 and the thready projections 150 are tightly contacted in the hole of the workpiece.

In the present invention, restoration characteristics of the portions of the wall of the hole in the workpieces compressed by the projections is good and sufficient, since the transformable portion of the wall of the hole is petaliferously compressed around the projections and the transformable portions are arranged petaliferously on the periphery of the shank 130. And more tight and strong fastening force is obtained, since the restored wall of the transformed portion is tightly contacted on the equivalent low height thread convolutions.

The present invention has the thread projections on the equivalent height convolutions, and accordingly, it is possible to adjust slightly the fastening force in comparison with a conventional screw. Namely, refastening of the thread fastener is easily accomplished when looseness occurs between the threaded fastener and the workpiece after use for a long time and/or by vibration of the workpiece.

In the method of producing the same, it is easy to produce in a simple way the shallow grooves in conventional rolling dies and to provide additional enlarged grooves by a rotary cutter. In addition to this feature, both the grooves are formed as similar cross sectional figures, therefore, any appropriate grooves for projections is able to be cut by exchange the cutter B. By using of the present dies, the threaded fasteners are manufactured by mass rolling production methods as in the conventional way.

In a case where rolling production is used, a shaft material is pressed between both the surfaces of dies 210 which are oppositely set. The end portion of the shaft material is forwarded to the shallow grooves 220 of the dies means by pressing and holding function, then the shaft material is forwarded to the deep grooves 240 to form the projections. Thereby, the thread fastener A shown in FIG. 2 is produced. As understood from the above described method, the equivalent height thread convolutions are formed by the shallow grooves, and the thread-type projections are also formed by the deep grooves, then the projections are petaliferously formed by the groove. Therefore, the volume of the shaft material which is forwarded into the grooves is relatively reduced, and the forming of the threaded fastener is easily accomplished. Also, it is easy to drive the shaft material into the deep grooves 240, since firstly the shaft material is driven into the shallow groove 220.

It is noted that any modification of the present embodiment of the thread fastener of the present invention will be easily made within the scope of the claims of this application. As any other embodiment of the threaded fastener, it is possible to appropriately form the shape of the cross-section of the thread convolutions and the projections by exchange of the cutting edge of the rotary cutter which are not symmetrical, which is not shown in the drawings, in order to decrease the torque of the fastening and to increase resilient torque for looseness.

The length of the thread-type projections is appropriately changed within half length of periphery of the shank or shaft, and accordingly, the torque for fastening the thread fastener is reduced in proportion to the reduction of the contacting area in the hole of with the workpiece. Simultaneously, strong fastening is accomplished by easily resilient restoration of the wall of the hole around the projections.

The number of the projections and/or their arrangement on the thread convolutions around the shank is appropriately provided, so that, by opposite and/or balanced arrangement of the projection around the shank, the threaded fastener of the present invention is prevented from misalignment in the hole during the fastening operation and the tightness and the fastening force are increased. Where the number of the projections is increased, a very strong fastening force at the fastening portions against the workpiece is produced.

In the present invention, the tapered portion 131 of the end of the shank may be changed to a conical or cylindrical end. Also, the head 120 may be omitted and only an appropriate slot 110 may be provided at the end portion in lieu of the head 120.

The thread fastener of the present invention is provided with equivalent height continuous thread convolutions and a plurality of thread-type projections are petaliferously formed in spaced relationship on the equivalent height thread convolutions and the cross-sections of both the thread convolution and projection are relatively similar, and accordingly, fastening torque against the resilient material workpieces and work efficiency is increased. After fastening thereof, strong fastening and/or fixing force is obtained on the workpieces and a slightly adjustable operation is easily accomplished. The thread fastener structure of the present invention may be very simple and is provided at low cost by mass production thereof.

What is claimed is:

1. In a threaded fastener of the self-tapping screw type for fastening workpieces made of resilient elastic material having fastener receiving holes preformed therein, the fastener having a shank, a tip end and a head on the shank, and a uniform height helical screw thread on the shank having an appropriate lead angle, and a means on the head to facilitate rotating and driving said fastener, the improvement comprising:

a screw thread having a maximum thread diameter smaller than the diameter of the preformed hole, and smaller than the maximum diameter of the standard screw thread of a standard screw of the same size;

a plurality of screw thread type projections disposed in spaced relationship on said screw thread along the full length of the shank except the tip end thereof and having the same lead angle as said screw thread; and said uniform height screw thread and said screw thread type projections having similar cross-sectional shapes, and said screw thread type projections each having a length shorter than half of the circumference of the shank, and having a crest surface having one end starting from the crest surface of said uniform height screw thread and gradually increasing in the lead direction and forming an enlarged slope surface ending at a thread tip on the crest surface of the projection of maximum height, the width and height thereof in the lead direction from said thread tip gradually decreasing and forming a reduced slope surface with said crest surface of the projection ending at the other end thereof at the crest surface of the uniform height screw thread.

2. The improved threaded fastener as claimed in claim 1 wherein said maximum height of the thread tip of each projection is about 20% greater than the height of the screw thread of a standard screw of the same size having a standard screw thread.

3. The improved threaded fastener as claimed in claim 1 wherein said thread-type projections are spaced at regular uniform intervals along said uniform height screw thread.

4. The improved threaded fastener as claimed in claim 1 wherein said thread-type projections are spaced at irregular non-uniform intervals along said uniform height screw thread.

5. The improved threaded fastener as in claim 1 wherein said means to facilitate rotating and driving on said head end comprises a slot means for a driving tool.

6. The improved threaded fastener as claimed in claim 3 wherein said projections are positioned substantially oppositely with respect to each other on opposite sides of said shank so that said fastener is prevented from mis-alignment in the fastener hole during insertion.

7. The improved threaded fastener as claimed in claim 4 wherein said projections are positioned substantially oppositely with respect to each other on opposite sides of said shank so that said fastener is prevented from mis-alignment in the fastener hole during insertion.

8. The threaded fastener as claimed in claim 1 wherein the cross-sectional shape of each projection has a smaller included angle than that of said uniform height helical screw thread.

9. The threaded fastener as claimed in claim 1 wherein said tip end is reduced in diameter with respect to the shank by a frusto-conical surface forming the tip end, the larger base of which is substantially equal to the diameter of the shank.

10. The improved threaded fastener as claimed in claim 2 wherein said thread-type projections are spaced at regular intervals on the equivalent height thread convolutions.

11. The improved threaded fastener as in claim 10 wherein said means to facilitate rotating and driving on said head end comprises a slot means for a driving tool.

12. The improved threaded fastener as claimed in claim 11 wherein said projections are positioned substantially oppositely with respect to each other on opposite sides of said shank so that said fastener is prevented from mis-alignment in the fastener hole during insertion.

13. The threaded fastener as claimed in claim 12 wherein the cross-sectional shape of said projection has a smaller included angle than that of said thread convolution.

* * * * *